United States Patent
Dunn

(10) Patent No.: US 10,287,936 B2
(45) Date of Patent: May 14, 2019

(54) OIL DRAIN FOR AN INTERNAL COMBUSTION ENGINE

(71) Applicant: Ford Global Technologies, LLC, Dearborn, MI (US)

(72) Inventor: Matthew Dunn, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 15/400,860

(22) Filed: Jan. 6, 2017

(65) Prior Publication Data
US 2018/0195423 A1    Jul. 12, 2018

(51) Int. Cl.
| | | |
|---|---|---|
| F01M 13/04 | (2006.01) | |
| F02M 25/06 | (2016.01) | |
| F02F 1/20 | (2006.01) | |
| F02F 1/24 | (2006.01) | |
| F01M 11/02 | (2006.01) | |
| F01M 13/00 | (2006.01) | |

(52) U.S. Cl.
CPC ............ *F01M 13/04* (2013.01); *F01M 11/02* (2013.01); *F02F 1/20* (2013.01); *F02F 1/24* (2013.01); *F02M 25/06* (2013.01); *F01M 2013/0038* (2013.01); *F01M 2013/0488* (2013.01); *Y02T 10/121* (2013.01)

(58) Field of Classification Search
CPC ........... F01M 13/04; F01M 2013/0038; F01M 13/00; F02F 1/20; F02F 1/24; F02F 7/0065; F02M 25/06
See application file for complete search history.

(56) References Cited

U.S. PATENT DOCUMENTS

| | | | |
|---|---|---|---|
| 3,514,167 A | 5/1970 | Wahl, Jr. | |
| 2015/0315996 A1* | 11/2015 | Quinton | ................ F02F 7/0007 123/195 R |
| 2017/0306883 A1* | 10/2017 | Lee | ........................ F02F 7/0065 |

FOREIGN PATENT DOCUMENTS

WF     2012108652 A2    8/2012

* cited by examiner

*Primary Examiner* — Jacob Amick
(74) *Attorney, Agent, or Firm* — Julia Voutyras; McCoy Russell LLP

(57) ABSTRACT

An internal combustion engine is provided with one or more oil drain-back passages. The oil drain-back passage include an entrance into a crankcase via a crankcase breathing window, the crankcase breathing window disposed within and through a bulkhead wall of the crankcase. Thus, each oil drain-back passage may be routed from a cylinder head of the engine to a crankcase breathing window where oil may then enter the crankcase and flow downward into an oil pan coupled to the crankcase.

20 Claims, 7 Drawing Sheets

OIL DRAIN FOR AN INTERNAL COMBUSTION ENGINE

FIELD

The present description relates generally to an oil drainback for an internal combustion engine.

BACKGROUND/SUMMARY

Lubricating oil in an internal combustion engine is used to lubricate engine components to reduce wear, seizing, and overheating, thereby extending the life of the engine. Lubricating oil may be pumped from an oil sump of the engine through passageways to various components of the head of the engine (e.g., camshaft bearings, lash adjusters, and variable cam timing components) and throughout the engine (e.g., to main bearings, pistons, the crankshaft, etc.). Gravity then pulls the oil back down to the oil pan through oil drain-back passages. The oil drains from the engine head through the oil drain-back passages to replenish the oil within the oil pan which is continuously pumped throughout the engine via a high pressure oil circuit.

However, the inventors herein have recognized potential issues with such systems. As one example, at high engine speeds, large pressure fluctuations driven by the translation of the pistons, rotation and translation of the connecting rods, and the rotation of the crankshaft occur in the crankcase. The dominant flow mechanism is produced by the translational motion of the pistons. This phenomenon is commonly known as crankcase pumping and is attributed to power losses, as well as inhibiting the flow of oil down the oil drain-backs. As a result, at high engine speeds, oil may accumulate in the cylinder head and not drain down to the oil sump. Further, the oil pump will not replenish oil throughout the engine if the oil is unable to drain to the oil sump, thereby leading to insufficient oil circulation and potential wear of components in the engine.

In one example, the issues described above may be addressed by an engine (e.g., an internal combustion engine) comprising: a cylinder block including a plurality of cylinders, each cylinder including a piston disposed therein; a crankcase including a plurality a bulkhead walls separating pistons of the plurality of cylinders, where at least one bulkhead wall includes a crankcase breathing window disposed therein and fluidly coupling two adjacent crankcase bays; and an oil drain-back passage including an entrance into the crankcase at the crankcase breathing window. As one example, the crankcase breathing window may be a passage arranged between the two adjacent crankcase bays, through the at least one bulkhead wall separating the two adjacent crankcase bays. The breathing window may create a localized constriction through which a fluid's velocity increases and the fluid's pressure reduces, thereby causing a Venturi effect. By directing the oil-drain passage into the crankcase via the crankcase breathing window, the low pressure caused by the Venturi effect during engine operation creates a suction and downward flow of oil from the cylinder head, thereby leading to more oil drain-back into the oil sump. Thus, oil circulation through the engine may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
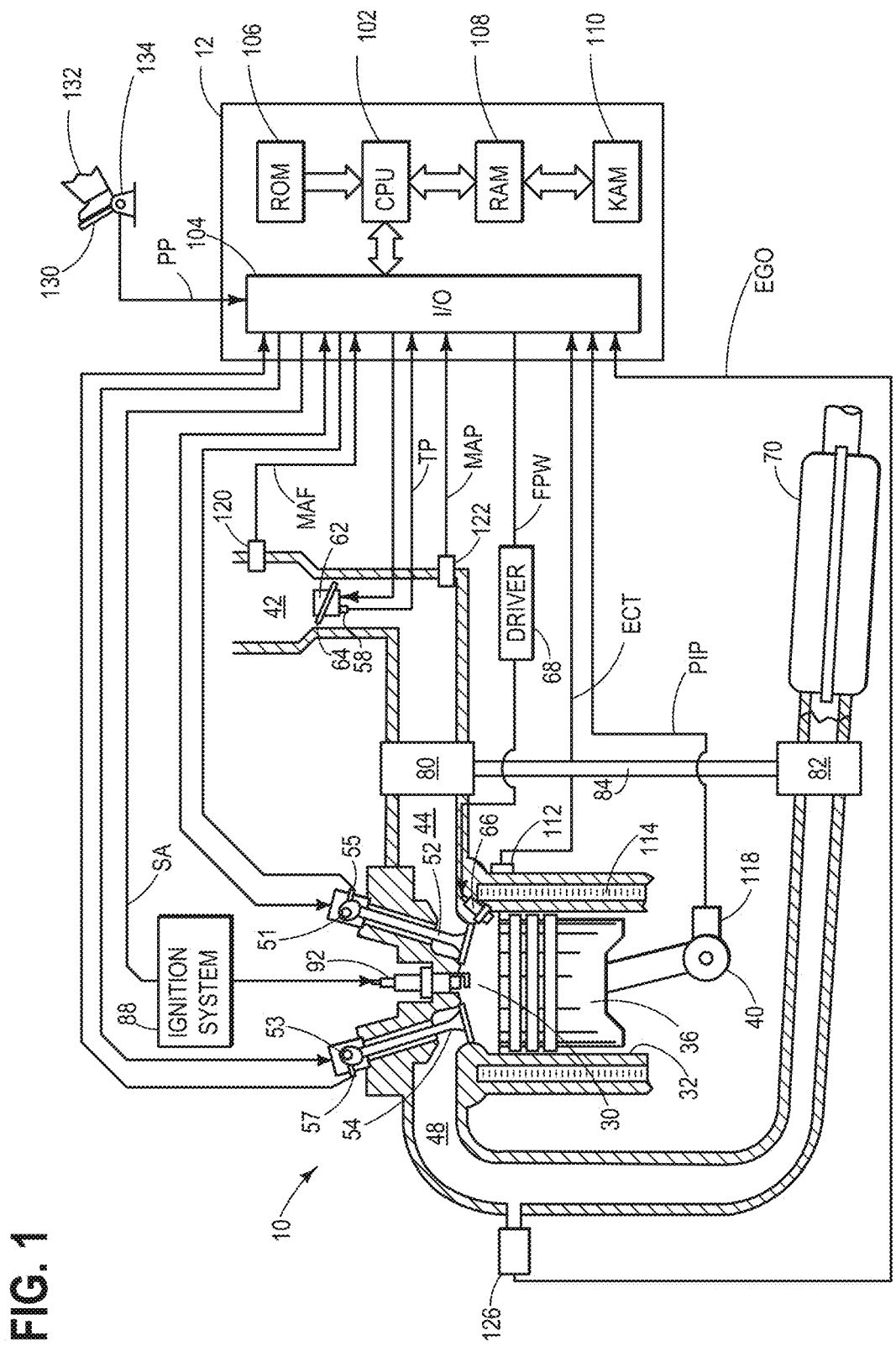
FIG. 1 shows a schematic depiction of an internal combustion engine.
Figure 6:
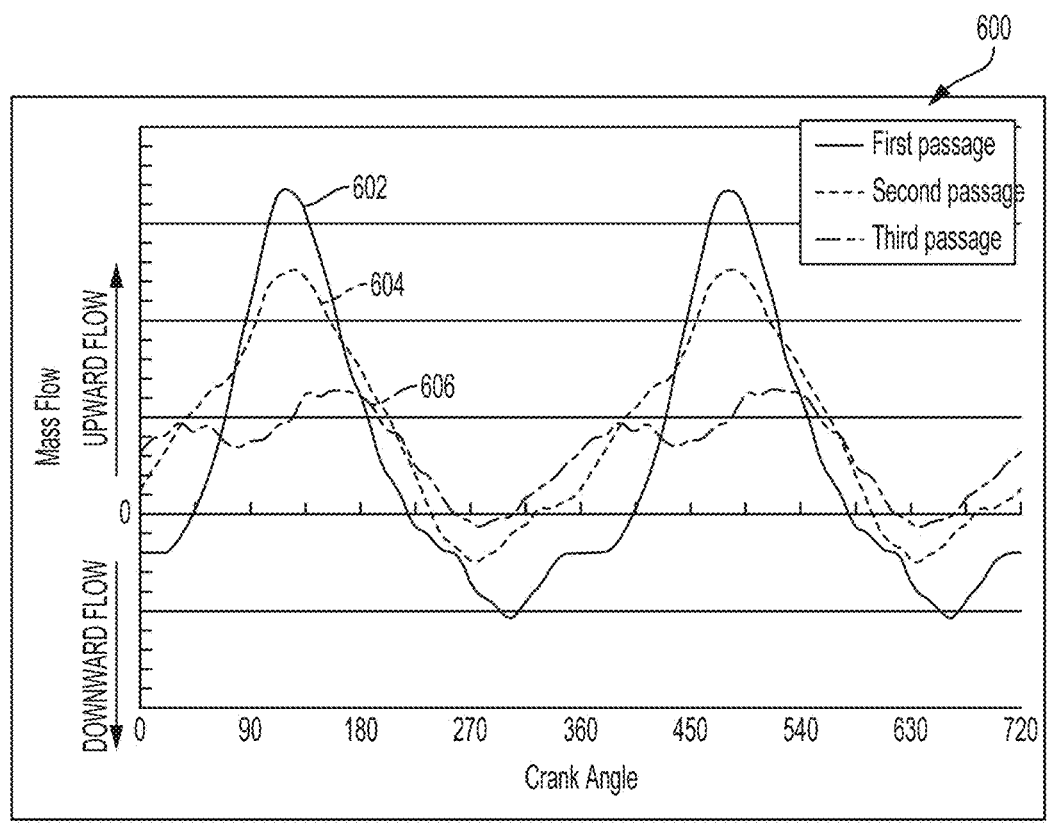
FIG. 6 shows a graph of the mass flow rate of oil through three oil-drain back passages in a traditional engine where the oil drain-back passages run from the cylinder heads to the oil pan outside of the bulkhead walls of the crankcase.
Figure 7:
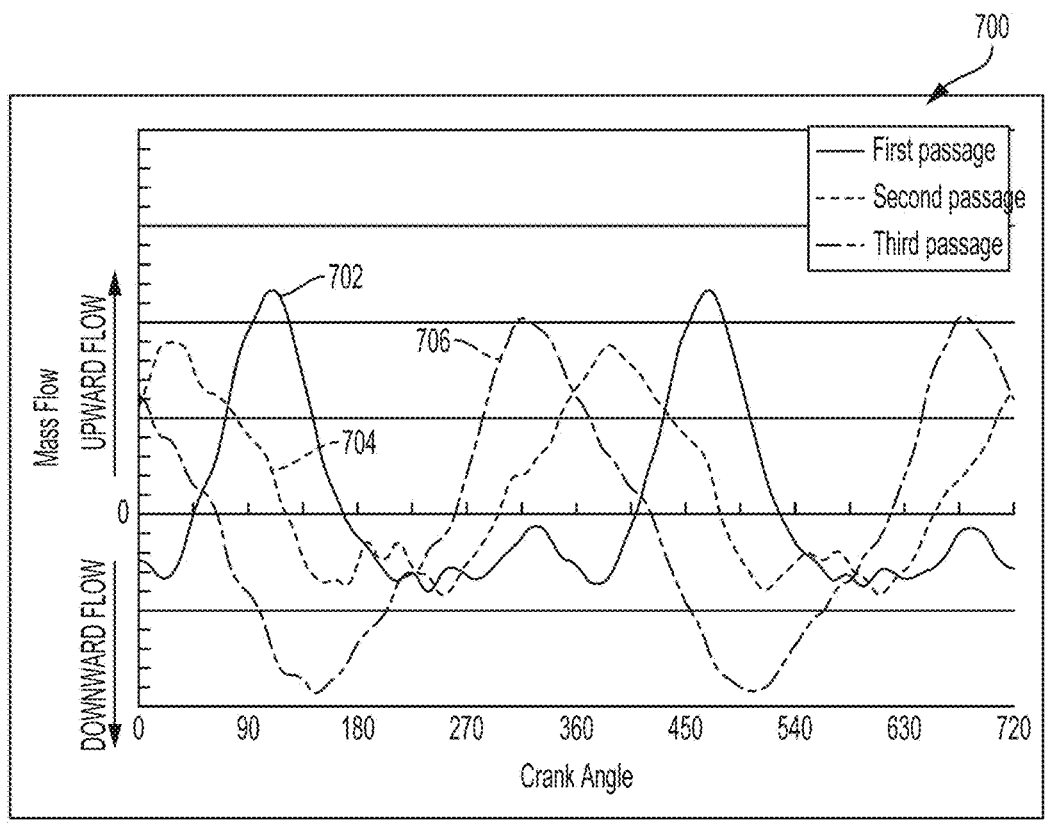
FIG. 7 shows a graph of the mass flow rate of oil through three oil-drain back passages in an engine where the oil drain-back passage run from the cylinder heads to the crankcase breathing windows and thus enter the crankcase through the crankcase breathing windows.

The following description relates to systems for oil drainback passages for an internal combustion engine, where the oil drain-back passages include an entrance into a crankcase of the engine arranged at a crankcase breathing window. As one example, the crankcase breathing windows may be positioned within bulkhead walls of the crankcase. Each bulkhead wall separates two adjacent crankcase bays. A different piston of a corresponding engine cylinder moves within each of the crankcase bays. A representative cylinder of the engine is shown in FIG. 1. Further, FIGS. 2-5 shows examples of oil drain-back passages coupled to a crankcase breathing windows and an arrangement of the crankcase breathing windows in multiple bulkhead walls. As shown in the graphs of FIGS. 6-7 and the computational fluid dynamics plots of FIGS. 8-9, having the oil drain-back passages enter the crankcase at the crankcase breathing windows (instead of at a lower deck or surface of the cylinder block) may increase the downward flow of oil through the oil drain-back passages and into the crankcase, thereby increasing the return of oil to the engine oil sump.

Referring to FIG. 1, internal combustion engine 10, comprising a plurality of cylinders, one cylinder of which is shown in FIG. 1, is controlled by electronic engine controller 12. Engine 10 includes cylinder 30 and cylinder walls 32 with piston 36 positioned therein and connected to crankshaft 40. Cylinder 30 may also be referred to as a combustion chamber. Cylinder 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures. Additionally or alternatively a fuel injector may be positioned upstream of intake valve 52 and configured to inject fuel into the intake manifold, which is known to those skilled in the art as port injection.

Distributorless ignition system 88 provides an ignition spark to cylinder 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may further include a turbocharger having a compressor 80 positioned in intake manifold 44 coupled to a turbine 82 positioned in exhaust manifold 48. A driveshaft 84 may couple the compressor to the turbine. Thus, the turbocharger may include compressor 80, turbine 82, and driveshaft 84. Exhaust gases may be directed through the turbine, driving a rotor assembly which in turn rotates the driveshaft. In turn the driveshaft rotates an impeller included in the compressor configured to increase the density of the air delivered to cylinder 30. In this way, the power output of the engine may be increased. In other examples, the compressor may be mechanically driven and turbine 82 may not be included in the engine. Further, in other examples, engine 10 may be naturally aspirated.

Figure 2:
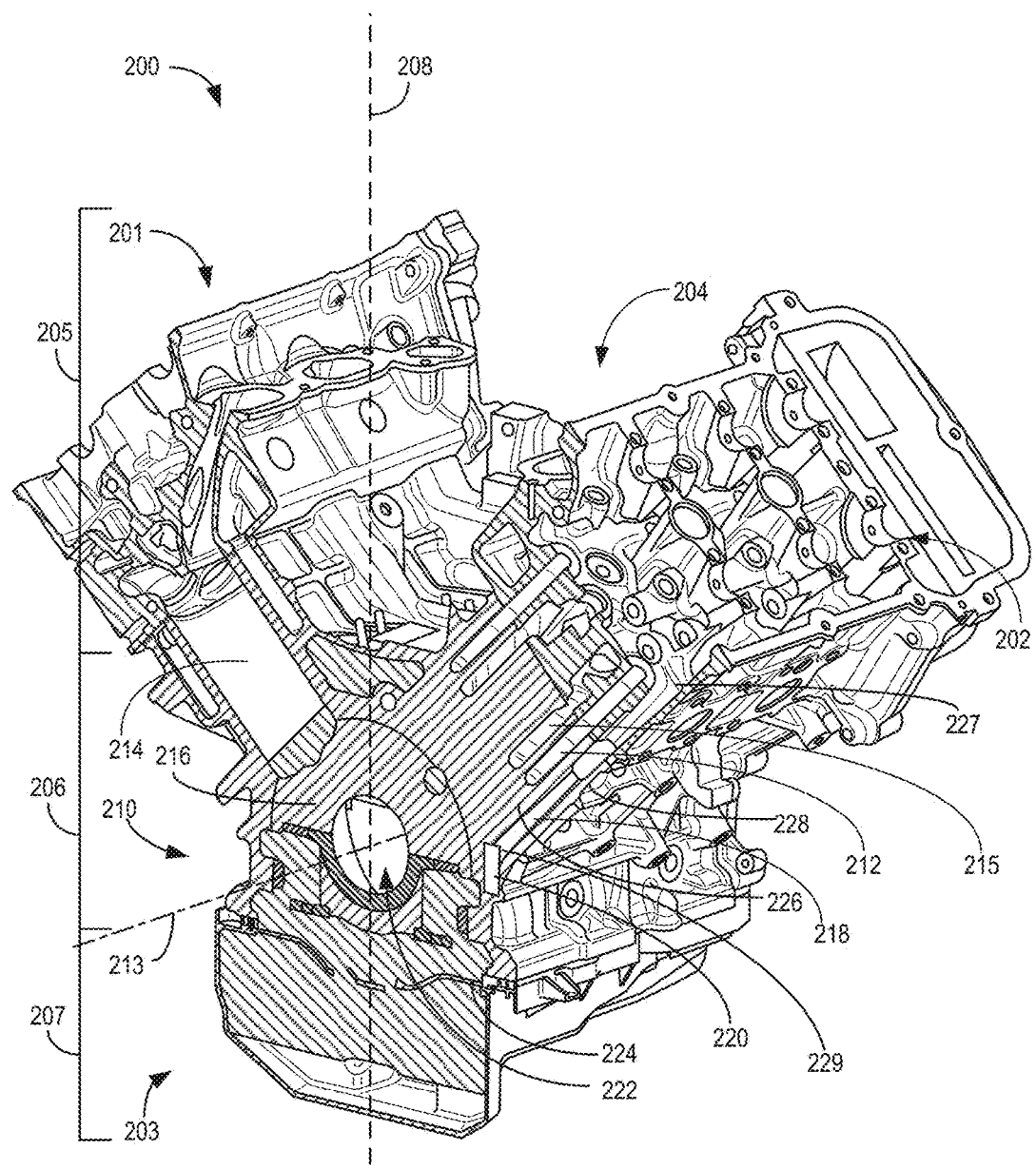
FIG. 2 shows a schematic cut-away diagram between a first set of two crankcase bays where an oil drain-back passage is including at an entrance into a crankcase breathing window in a bulkhead wall.
Figure 3:
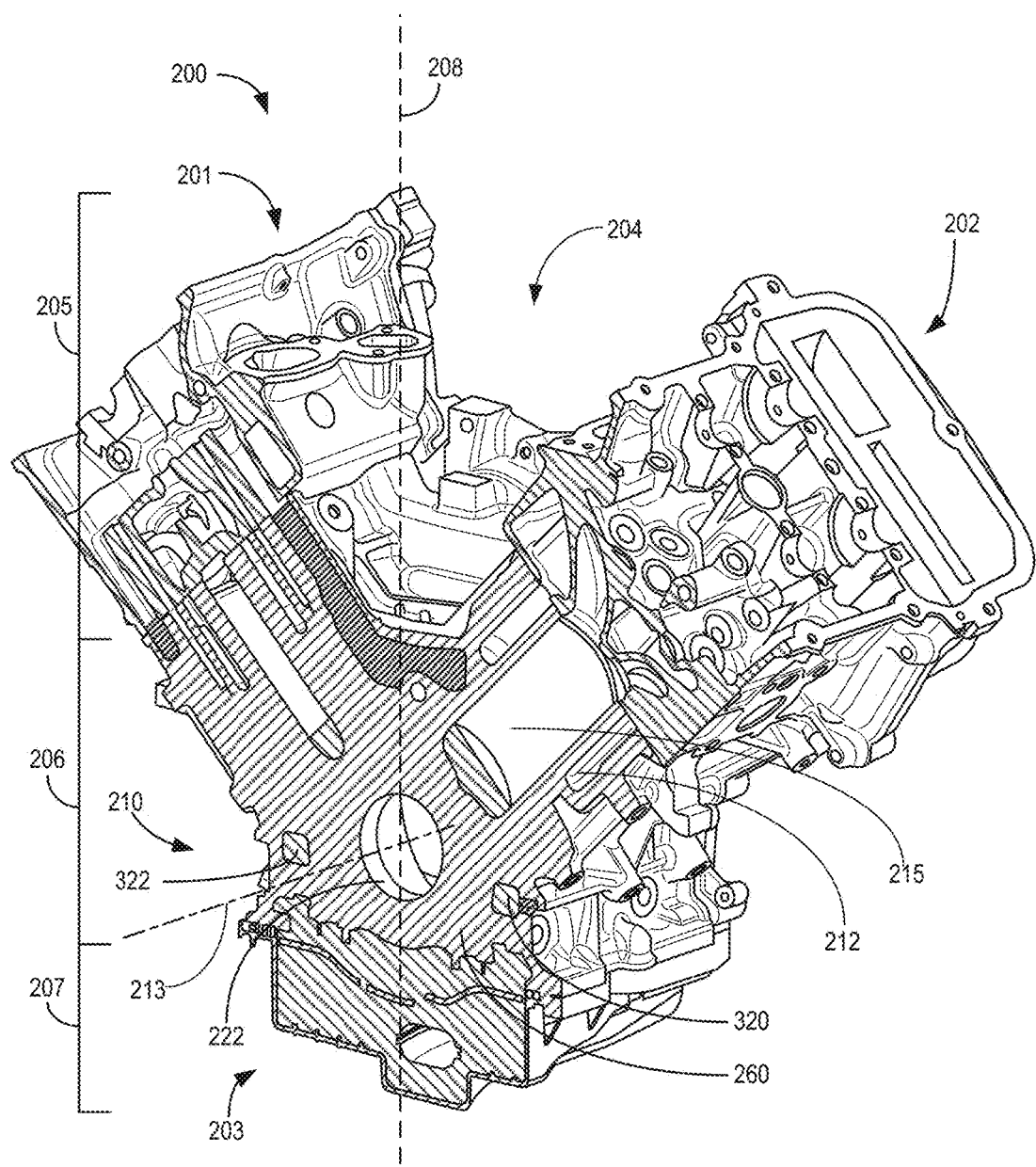
FIG. 3 shows a cut-away diagram between a second set of two crankcase bays and at a bulkhead wall.
Figure 4:
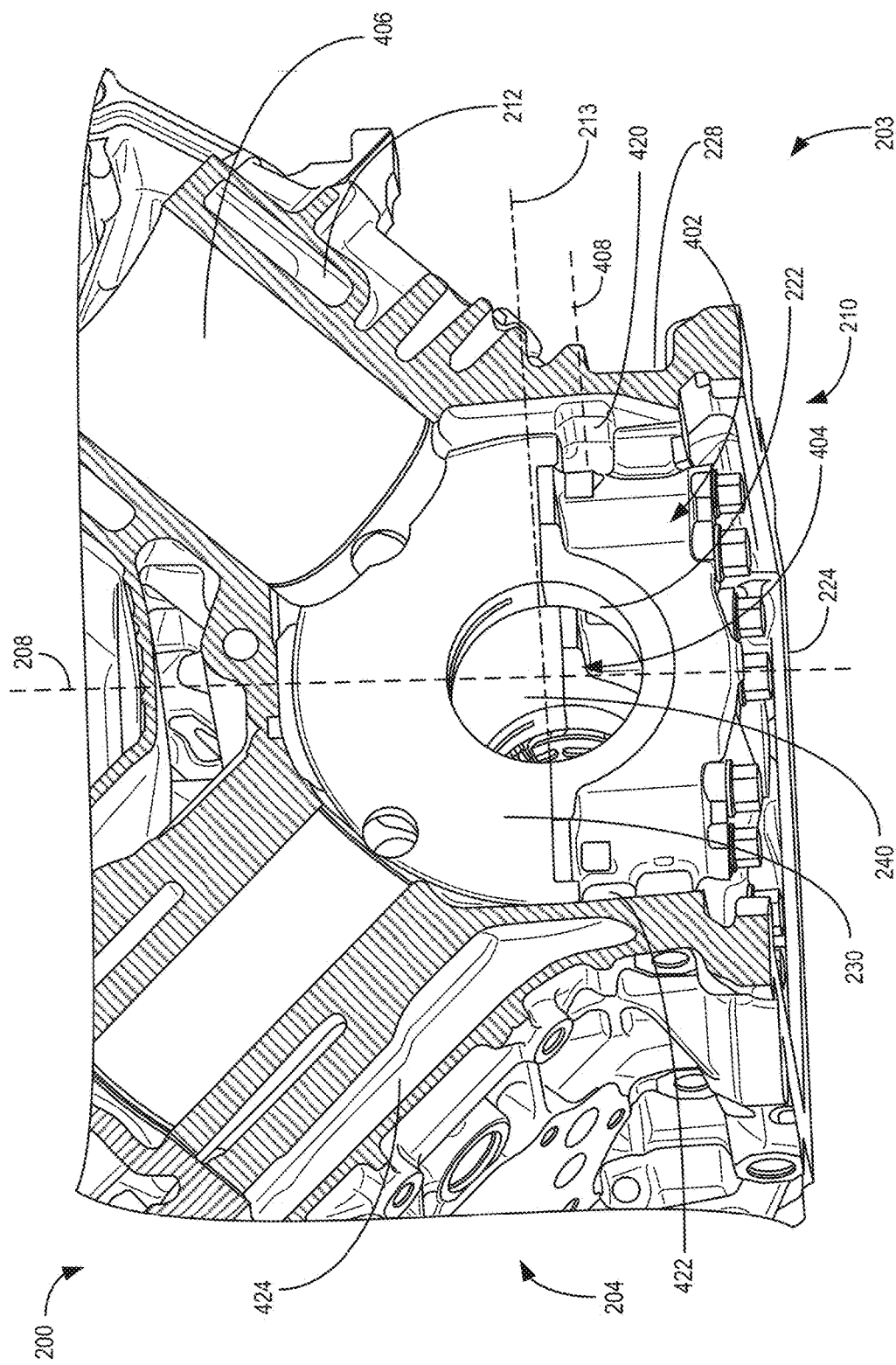
FIGS. 4-5 show closer views of cross-sections of an engine at different bulkhead walls showing a plurality of crankcase breathing windows.
Figure 5:
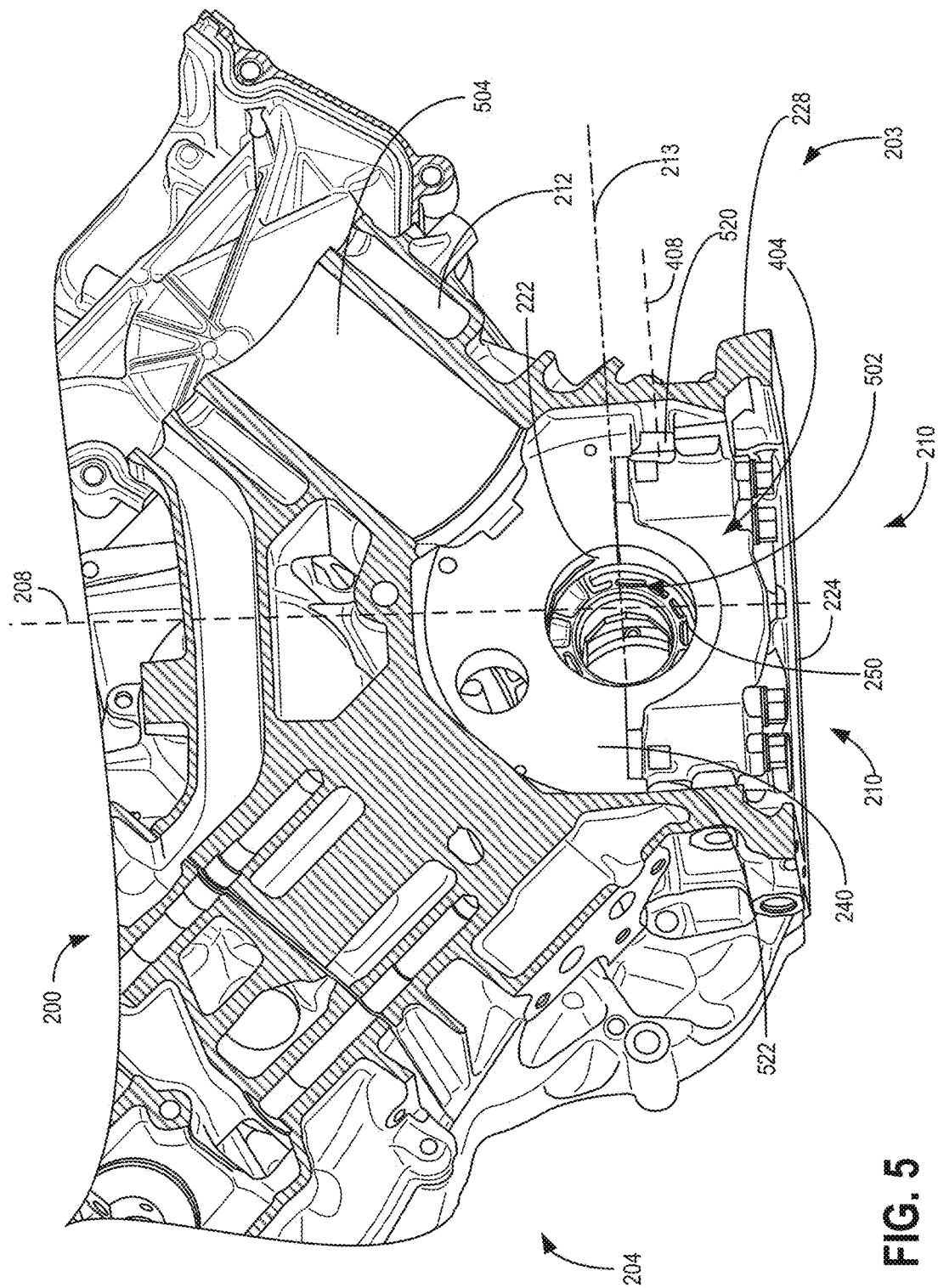

FIGS. 2-5 show various cross-sections and views of a V-type engine 200 having a central crankcase arrangement and one or more oil drain-back passages arranged with an entrance into the crankcase 210 at a crankcase breathing window arranged in a bulkhead wall (e.g., such as bulkhead wall 216 shown in FIG. 2) of the crankcase 210. As shown in FIGS. 2-5, the engine 200 includes a central, vertical axis 208 and the crankcase 210 includes a central axis 213 which is a central rotational axis of a crankshaft (such as crankshaft 40 shown in FIG. 1) running through apertures 222 in the bulkhead walls. The apertures may be referred to herein as central apertures and are each adapted (e.g., shaped) to receive the crankshaft. FIG. 2 shows a first cross-section of the engine 200, taken proximate to a first (e.g., front) end 203 of the engine 200, at a first bulkhead wall 216 arranged between two adjacent crankcase bays (e.g., spaces in the crankcase 210 that do not include bulkhead walls). FIG. 3 shows a second cross-section of the engine 200, taken at a fifth bulkhead wall 260 which is located between two adjacent crankcase bays and located further into the engine and toward the second end 104 of the engine than the first cross-section shown in FIG. 2. The second cross-section shown in FIG. 3 is positioned closer to a second (e.g., back) end 104 of the engine than the first cross-section shown in FIG. 2. FIG. 4 shows a zoomed-in view of a third cross-section of the engine 200, taken at a second bulkhead wall 230 which is arranged between two adjacent crankcase bays. FIG. 5 shows a zoomed-in view of a fourth cross-section of the engine 200, taken at a third bulkhead wall 240 which is arranged between two adjacent crankcase bays. The fourth cross-section shown in FIG. 5 is taken along the central axis 213, closer to the second end 204 than the third cross-section shown in FIG. 4, and at the third bulkhead wall 240 which is arranged between a different two adjacent crankcase bays than the second bulkhead wall 230. The views of FIGS. 4 and 5 focus on the breathing window and show multiple bulkheads of the crankcase 210.

The engine 200 shown in FIGS. 2-5 may be similar to and have similar components to those shown in FIG. 1, as described above. For example, engine 200 may include a plurality of cylinders which may each have a configuration similar the cylinder 30 shown in FIG. 1. As such, each cylinder shown in FIGS. 2-5 may include a piston disposed there with a connecting rod connecting each piston to the crankshaft which may be housed within the crankcase 210. For example, the crankshaft (e.g., crankshaft 40 shown in FIG. 1) may be centered along central axis 213 and thus extend through apertures 222 arranged in each bulkhead wall.

Engine 200 shown in FIGS. 2-5 is configured as a V-type engine where the cylinders and pistons are aligned in two separate planes or "banks" forming a "V" shape when viewed along the central axis 213 of the crankcase 210. Specifically, engine 200 includes a first bank 201 arranged on a first side of the engine 200 and a second bank 202 on a second side of the engine. As introduced above, engine 200 also has a first end 203 (e.g., a front end) and an opposed, second end 204 (e.g., a back end). The first and second banks each include a plurality of cylinders. For example, engine 100 may be a V-4, V-8, or V-12 engine, among others.

As shown in FIGS. 2-3, engine 200 comprises a cylinder head 205 coupled to a cylinder block 206 and an oil pan (also referred to herein as an oil sump) 207 coupled to the cylinder block 206. The cylinder block 206 comprises the plurality of cylinders arranged in an upper portion of the cylinder block 206 and a crankcase 210 arranged in a lower portion of the cylinder block 206. The crankcase 210 includes a plurality of bulkhead walls arranged along central axis 213. Flat, planar surfaces of the bulkhead walls are arranged perpendicular to the central axis 213. The bulkhead walls are spaced apart from one another and include apertures 222 adapted to receive the crankshaft. A crankshaft bay (e.g., an open space within crankcase 210, as pointed out in FIGS. 4 and 5) is positioned between two adjacent bulkhead walls. FIG. 2 shows the first bulkhead wall 216, FIG. 4 shows a second bulkhead wall 230 and third bulkhead wall 240, and FIG. 5 shows the third bulkhead wall 240 and a fourth bulkhead wall 250. A bottom surface 224 of the crankcase 210 is directly coupled to a top surface of the oil pan 207. Further, a top surface of the cylinder block 206 is directly coupled to a bottom surface of the cylinder head 205.

FIG. 2 shows a first cylinder 214 (e.g., interior of a cylinder) arranged in the first bank 201 and a second cylinder 215 (only a portion or edge of the second cylinder 215 is seen in FIG. 2) arranged in the second bank 202. A coolant jacket may surround an outer wall of each cylinder. For example, as shown in FIG. 2, a coolant jacket 212 surrounds second cylinder 215 (e.g., around a circumference of an outer wall of the cylinder 215). Cooling fluid (e.g., water or coolant) may flow through the coolant jacket 12 (and the coolant jackets of the other cylinder) in order to cool the second cylinder 215.

As introduced above, a crankcase breathing window 220 is positioned within the first bulkhead wall 216, between two adjacent bulkhead walls (one forward of and one behind the bulkhead wall 216). The crankcase breathing window 220 extends between and fluidly couples the two adjacent crankcase bays with one another, as described further below with reference to FIGS. 4-5. Additionally, an oil drain-back passage 218 is arranged in a cylinder block wall 226 of the cylinder block 206. Specifically, the oil drain-back passage 218 is positioned in the cylinder block wall 226, between the coolant jacket 212 and an exterior wall 228 of the cylinder block. Said another way, the oil drain-back passage 218 is positioned in the cylinder block wall 226, outside of the coolant jacket 212, relative to the vertical axis 208. The oil drain-back passage 218 is routed through the cylinder block wall 226, from the cylinder head 205 to the crankcase breathing window 220. For example, the oil drain-back passage 218 includes an inlet end 227 coupled to the cylinder head and an outlet end 229 coupled to the crankcase breathing window 220. In this way, the oil drain-back passage 218 is configured to direct (and return) oil from the cylinder head 206 to the crankcase 210 and oil pan 207 via the crankcase breathing window 220. Both the oil drain-back passage 218 and the crankcase breathing window 220 are arranged between the two adjacent crankcase bays.

As shown in FIG. 2, the oil drain-back passage 218 has an entrance into the crankcase 210 at the crankcase breathing window 220. In one example, the oil drain-back passage 218 couples to and enters the crankcase breathing window 220 through a top (e.g., relative to the vertical axis 208) of the crankcase breathing window 220. In alternate embodiments, the oil drain-back passage may enter the crankcase breathing window 220 at a side of the crankcase breathing window. The crankcase breathing window 220 is arranged in a same plane as the first bulkhead wall 216.

As air passes through the crankcase breathing window 220, during engine operation, the smaller diameter of the crankcase breathing window 220, relative to the larger cross-sectional area of the crankcase bays, increases air velocity while reducing air pressure. This phenomenon is known as the Venturi effect. The Venturi effect creates a downward suction force that pulls the engine oil from the higher portion of the oil drain-back passage 218 (at the cylinder head) into the crankcase breathing window 220 and the crankcase 210. Oil entering the crankcase 210 via the crankcase breathing window 220 may then be drawn down to the oil pan 207 via gravity.

Turning now to FIG. 3, the second cross-section of the engine 200, taken at the fifth bulkhead wall 260, which is located between two adjacent crankcase bays, is shown. The fifth bulkhead wall 260 is positioned between two different adjacent crankcase bays than the first bulkhead wall 216 shown in FIG. 2. However, in one example, the first bulkhead wall 216 and the fifth bulkhead wall 260 may share one crankcase bay (e.g., the first and fifth bulkhead walls may be arranged adjacent to one another such that one crankcase bay separates them from one another). The fifth bulkhead wall 260 includes a first crankcase breathing window 320 and a second crankcase breathing window 322, where the first and second crankcase breathing windows are arranged on opposite sides of the fifth bulkhead wall 260, across the aperture 222 from one another. As shown in FIG. 3, there may be no oil-drain back passage positioned within the fifth bulkhead wall 260.

FIG. 4 shows an enlarged view of a third cross-section of the engine 200, taken at the second bulkhead wall 230 which is arranged between (and separates) a first crankcase bay 402 (arranged forward relative to the central axis 213, or out of the page) and a second crankcase bay 404 (arranged rearward, closer to the second end of the engine 200 than the first crankcase bay 402). A third bulkhead wall 240 is also seen in FIG. 4. The third bulkhead wall 240 is positioned behind, relative to the central axis 213, and spaced away from the second bulkhead wall. Specifically, the second crankcase bay 404 separates the third bulkhead wall 240 from the second bulkhead wall 230. In this way, the second bulkhead wall 230 is positioned between two adjacent crankcase bays, 402 and 404. FIG. 4 also shows a cylinder 406 (which may, in one example, be the same as cylinder 215 shown in FIG. 3) and a coolant jacket 212 surrounding an outer wall of the cylinder 406. A first crankcase breathing window 420 and second crankcase breathing window 422 (which may be the same as crankcase breathing window 220 shown in FIG. 2, but positioned in a different bulkhead wall of the engine 200 than the wall shown in FIG. 2) are positioned within the second bulkhead wall 230. Only a portion of the second crankcase breathing window 422 is shown in the view of FIG. 4, but it may have a same geometry and configuration, but on an opposite side of the second bulkhead wall 230 from the first crankcase breathing window 420, as the first crankcase breathing window 420, which is described in further detail below. Additionally, an oil-drain back passage 424 is shown in FIG. 4, running through the cylinder block wall and entering the second crankcase breathing window 422.

Specifically, the crankcase breathing window 420 shown in FIG. 4 is arranged through the second bulkhead wall 230, from the first crankcase bay 402 to the second crankcase bay 404. Thus, the crankcase breathing window 420 may be referred to as a passage (having a passage length that is the same as a width, or thickness, of the bulkhead wall) disposed within and through the second bulkhead wall 230. The crankcase breathing window 420 may include a window central axis 408 arranged through a center of the crankcase breathing window 420, from the first crankcase bay 402 to the second crankcase bay 404. The window central axis 408 is arranged normal to a planar surface of the second bulkhead wall 230 which is also arranged normal to the central axis 213. Further, the window central axis 408 is arranged parallel to the bottom surface 224 of the crankcase 210. In this way, the central axis 213 of the crankcase 210 is parallel to the window central axis 408. The window central axis 408 and the central axis 213 of the crankcase are not coaxial with one another. Instead, the window central axis 408 is spaced away from the central axis 213 and positioned closer to the exterior wall 228 of the cylinder block (which is also the exterior wall of the crankcase 210). Thus, the crankcase breathing window 420 is positioned closer to an outer edge of the second bulkhead wall 230 than an inner edge of the second bulkhead wall located at the aperture 222. Further, the window central axis 408 is positioned lower than the central axis 213 of the crankcase 210 relative to the central, vertical axis 208 of the engine 200. Additionally, a cross-sectional area of the crankcase breathing window 420 (defined in a plane perpendicular to the central axis 213) is smaller than a cross-sectional area of the aperture 222 and a cross-section area of the crankcase bays 402 and 404. Said another way, the width, or diameter in the case of a circular window, of the crankcase breathing window 420 is smaller than a diameter of the aperture 222. Thus, the smaller cross-sectional area of the crankcase breathing window 420 creates a constriction in air flow between the first crankcase bay 402 and second crankcase bay 404. As explained above, this may increase the air flow velocity through the crankcase breathing window 420 and create a Venturi. This may result in a suction force at the crankcase breathing window 420, thereby pulling oil downward through the oil drain-back passage coupled to the crankcase breathing window 420 and into the crankcase 210 and the oil pan. Though no oil drain-back passage is shown coupled to the first crankcase breathing window 420, the oil drain-back passage 424 is shown coupled to the second crankcase breathing window 422 which may have the same configuration as described above (and thus function the same as) for the first crankcase breathing window 420.

FIG. 5 shows an enlarged view of the fourth cross-section of the engine 200, taken at the third bulkhead wall 240 which is arranged between (and separates) the second crankcase bay 404 (arranged forward relative to the central axis 213, or out of the page in FIG. 5) and a third crankcase bay 502 (arranged rearward, closer to the second end of the engine 200 than the second crankcase bay 404). A fourth bulkhead wall 250 is also seen in FIG. 5. The fourth bulkhead wall 250 is positioned behind, relative to the central axis 213, and spaced away from the third bulkhead wall 240. Specifically, the third crankcase bay 502 separates the third bulkhead wall 240 from the fourth bulkhead wall 250. In this way, the third bulkhead wall 240 is positioned between two adjacent crankcase bays, 404 and 502, which are a different two crankcase bays than the two crankcase bays 402 and 404 which the second bulkhead wall 230 is positioned between.

FIG. 5 also shows a cylinder 504 and a coolant jacket 212 surrounding an outer wall of the cylinder 504. A first crankcase breathing window 520 and second crankcase breathing window 522 (which may be the same as crankcase breathing window 220 shown in FIG. 2, but positioned in a different bulkhead wall of the engine 200 than the wall shown in FIG. 2) are positioned within the third bulkhead wall 240, but on opposite sides of the third bulkhead wall 240 relative to the aperture 222. Specifically, the crankcase breathing windows 520 and 522 shown in FIG. 5 are arranged through the third bulkhead wall 240, from the second crankcase bay 404 to the third crankcase bay 502. Thus, the crankcase breathing windows 520 and 522 may be referred to as passages (having a passage length that is the same as a width, or thickness, of the bulkhead wall) disposed within and through the third bulkhead wall 240. As shown for the first crankcase breathing window 520, the crankcase breathing windows may include a window central axis 408 arranged through a center of the crankcase breathing window 520, from the second crankcase bay 404 to the third crankcase bay 502. The crankcase breathing windows 520 and 522 may be arranged similarly in the third bulkhead wall 240 to that of crankcase breathing window 420, as described above with reference to FIG. 4.

FIGS. 4 and 5 show a plurality of bulkhead walls of the engine 200 that are arranged along the central axis 213 of the crankcase 210, from the first (e.g., front) end 203 of the engine 200 to the second (e.g., rear) end 204 of the engine 200, and are separated from one another via a plurality of crankcase bays that include open spaces without bulkhead walls (and thus have a larger cross-sectional area). A piston of each cylinder is arranged within and connected to the crankcase in a space created by a corresponding crankcase bay. Movement of the pistons within their respective crankcase bays creates airflow through the crankcase breathing windows (e.g., at least one window in each bulkhead). As the airflow accelerates through the crankcase breathing windows (due to the smaller cross-sections of the windows, as described above), a suction effect is created, thereby pulling oil downward through the oil drain-back passages coupled directly to the crankcase breathing windows, toward an interior of the crankcase and the oil pan (e.g., sump). In this way, oil return to the oil pan and recirculation through the engine may be increased. In one embodiment, each crankcase breathing window of each bulkhead wall may be connected to one oil drain-back passage. In an alternate embodiment, only a portion of the crankcase breathing windows may be connected to an oil-drain back passage. For example, in one embodiment, there may be only one oil drain-back passage on each side of the engine (e.g., on each bank of the engine, or on each side of the engine relative to the crankshaft). More specifically, there may be one oil drain-back passage on each side of the cylinder block 206, porting into a crankcase breathing window of a single bulkhead wall. In this way, one bulkhead wall may include two crankcase breathing windows, arranged on opposite sides of the bulkhead wall relative to an aperture for the crankshaft, where each of the two crankcase breathing windows is coupled with a different oil drain-back passage. Thus, in one embodiment, only the windows of a single bulkhead wall of the crankcase may be coupled to the oil drain-back passages of the engine.

Turning now to FIGS. 6-7, example graphs of the mass flow rate of oil through three oil-drain back passages of an engine vs. a position of a crankshaft (e.g., crankshaft angle) are shown. The mass flow rate of oil is either positive, indicating upward flow, or negative, indicating downward flow through the oil drain-back passages. A greater distance from 0 indicates a larger mass flow through the passages. FIG. 6 shows a graph 600 of the mass flow rate of oil through three oil-drain back passages in a traditional engine where the oil drain-back passages run from the cylinder heads to the oil pan (e.g., sump) outside of the bulkhead walls of the crankcase (e.g., through an exterior wall of the cylinder block). The oil drain-back passages then enter into the cylinder block (e.g., crankcase) normal to a lower deck (e.g., bottom surface of the crankcase) of the cylinder block. Thus, is this traditional design, the oil drain-back passages do not connect to the crankcase breathing windows. Plot 602 shows the mass flow rate of oil through a first oil drain-back passage, plot 604 shows the mass flow rate of oil through a second oil drain-back passage, and plot 606 shows the mass flow rate of oil through a third oil drain-back passage. All three oil drain-back passages may be oriented on a same side (e.g., bank) of the engine, such as the right side. FIG. 7 shows a graph 700 of the mass flow rate of oil through three oil-drain back passages in an engine (such as engine 200 shown in FIGS. 2-5) where the oil drain-back passage run from the cylinder heads to the crankcase breathing windows and thus enter the crankcase through the crankcase breathing windows. Plot 702 shows the mass flow rate of oil through a first oil drain-back passage (which may correspond to a location of the passage shown in plot 602), plot 704 shows the mass flow rate of oil through a second oil drain-back passage (which may correspond to a location of the passage shown in plot 604), and plot 706 shows the mass flow rate of oil through a third oil drain-back passage (which may correspond to a location of the passage shown in plot 606). Similarly to FIG. 6, all three oil drain-back passages of FIG. 7 may be oriented on a same side (e.g., bank) of the engine, such as the right side.

As seen in a comparison of graph 600 and graph 700, the oil drain-back passage arrangement represented in graph 700 (e.g., of an engine such as engine 200) results in more downward flow through all three of the oil drain-back passages throughout more of the engine cycle than the traditional design represented in graph 600. In particular, the upward flow in all three of the oil drain-back passages of graph 700 are decreased by at least 30% compared to the passages of graph 600, and the downward flow in all three oil drain-back passages of graph 700 are increased by at least 25% compared to the passages of graph 600. This is especially apparent in the third drain-back passage (shown at plot 706), where for a significant portion of the engine cycle, oil is flowing in the desired downward direction.

Figure 8:
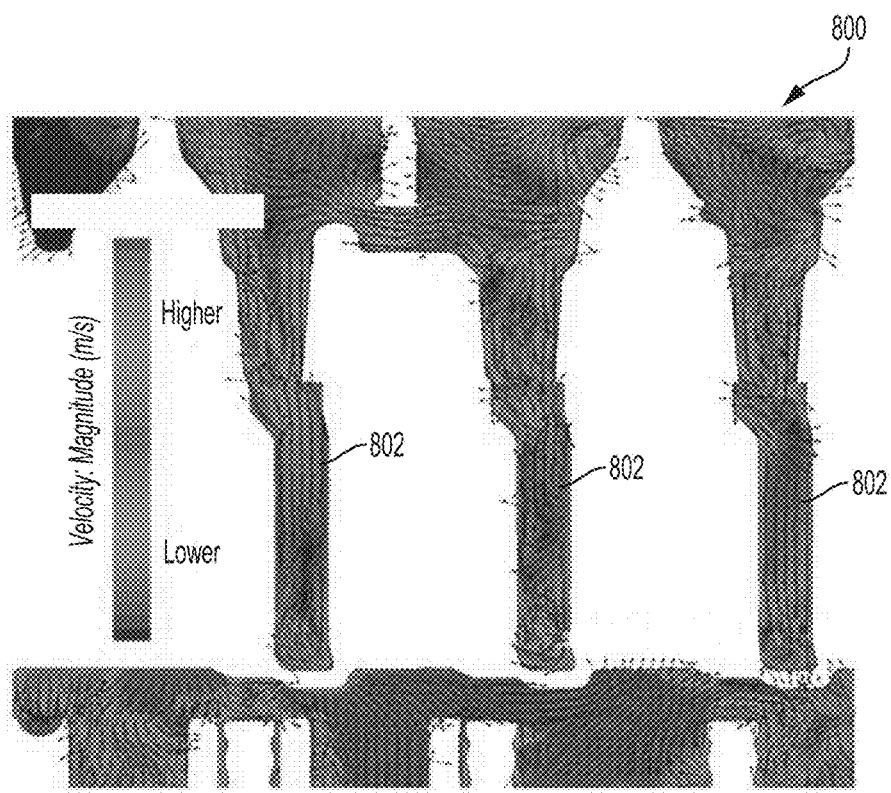
FIG. 8 shows a computational fluid dynamics plot that shows the flow through three oil drain back passages of a traditional engine where the oil drain-back passages enter the cylinder block at and normal to the lower deck of the cylinder block.
Figure 9:
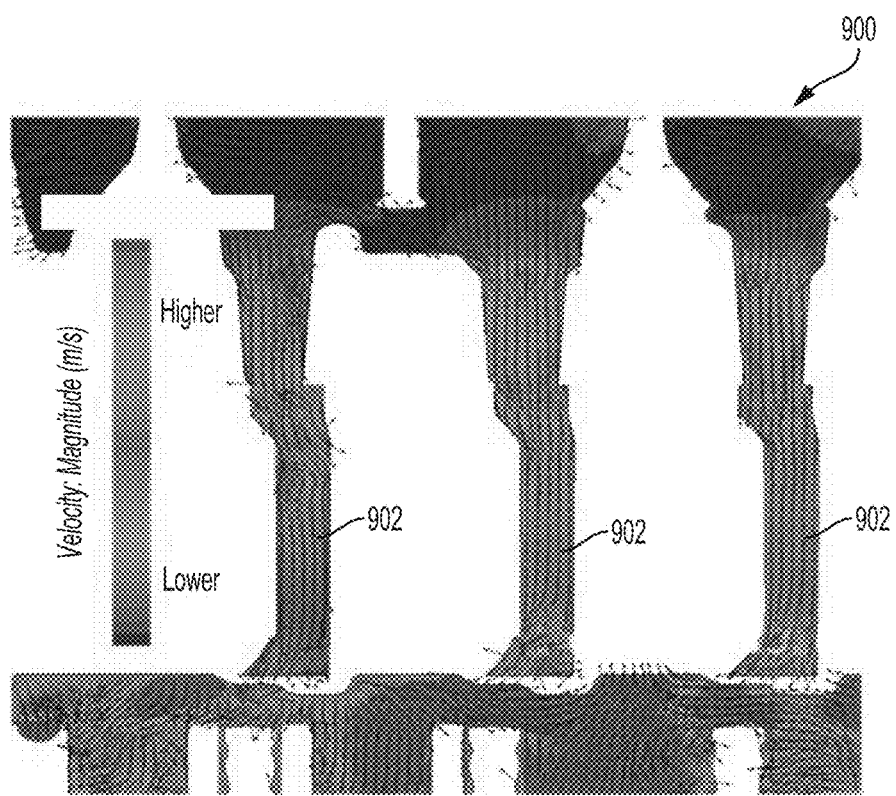
FIG. 9 shows a computational fluid dynamics plot that shows the flow through three oil drain back passages of an engine where the oil drain-back passages enter the crankcase and cylinder block through crankcase breathing windows.

Turning now to FIGS. 8-9, example computational fluid dynamics (CFD) results of downward flow through oil drain-back passages of an engine are shown at a same crank angle. Specifically, FIG. 8 shows a CFD plot 800 that shows the flow through three oil drain back passages 802 of a traditional engine where the oil drain-back passages enter the cylinder block at and normal to the lower deck of the cylinder block (as described above with reference to FIG. 6). In contrast, FIG. 9 shows a CFD plot 900 that shows the flow through three oil drain back passages 902 of an engine where the oil drain-back passages enter the crankcase and cylinder block through crankcase breathing windows (e.g., such as engine 200 shown in FIGS. 2-5 and as described above with reference to FIG. 7). In both plots 800 and 900, the small arrows indicate the direction of oil flow through the passages and the grayscale color indicates the magnitude of the velocity. As show by the grayscale legend, the varying grayscale colors show a range of velocity magnitudes.

As shown in FIG. 8, in traditional engine system where the oil drain-back passages open at the bottom of the cylinder block and do not coupled to the breathing windows, the oil flow is more random throughout the oil drain-back passages. In particular, the oil flow in most of the oil drain-back passages is upward or near zero. In contrast, as shown in FIG. 9, for the engine system where the oil drain-back passages connect to and enter the crankcase via the crankcase breathing windows, the oil flow through the passages is downward in all drains. In particular, the oil flow in the upper halves of the oil drain-back passages show a more uniformed downward flow direction, with a lower flow velocity. This is due to the face that the downward suction force created by the Venturi effect at the crankcase breathing windows overcomes the pressure fluctuations in the crankcases at higher engine speed. It can be seen in FIG. 9 that, the engine system shown in FIGS. 2-5 leads to more efficient draining of oil through the oil drain-back passages and into the crankcase and oil pan.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, an engine may include one or more oil drain passages (e.g., oil drain-back passages) that facilitate the draining of oil from cylinder heads of the engine to the crankcase and oil pan (e.g., sump) of the engine. As one example, each of these drain passages may include an entrance into the crankcase at a crankcase breathing window disposed in a bulkhead wall of the crankcase. During engine operation, as the pistons pump within their respective cylinders, air flows between crankcase bays in the crankcase via the crankcase breathing windows. Airflow accelerates through the crankcase breathing windows due to a restriction created by the smaller cross-sectional area (e.g., diameter) of the windows as compared to the crankcase bays. As a result, a suction force is created at the breathing windows and pulls oil draining within the oil drain passages through the passages and into the crankcase. Thus, the technical effect of having one or more oil drain-back passages including an entrance into the crankcase at crankcase breathing windows is increasing the downward flow of oil from the cylinder heads to the crankcase. As a result, more oil may return to the oil pan and thus oil recirculation through the engine may be increased and made more efficient.

As one embodiment, an engine includes a cylinder block including: a plurality of cylinders, each cylinder including a piston disposed therein; a crankcase including a plurality a bulkhead walls separating pistons of the plurality of cylinders, where at least one bulkhead wall includes a crankcase breathing window disposed therein and fluidly coupling two adjacent crankcase bays; and an oil drain-back passage including an entrance into the crankcase at the crankcase breathing window. In a first example of the engine, the engine further includes a cylinder head coupled to the cylinder block and wherein the oil drain-back passage is routed through a wall of the cylinder block, from the cylinder head to the crankcase breathing window. A second example of the engine optionally includes the first example and further includes, wherein the oil drain-back passage is routed through the wall of the cylinder block, outside of a coolant jacket surrounding a cylinder of the plurality of cylinders, relative to a central, vertical axis of the engine. A third example of the engine optionally includes one or more of the first and second examples, and further includes a cylinder head coupled to the cylinder block and wherein the oil drain-back passage includes an inlet end coupled to the cylinder head and an outlet end coupled to the crankcase breathing window. A fourth example of the engine optionally includes one or more of the first through third examples, and further includes, wherein the entrance of the oil drain-back passage is arranged between the two adjacent crankcase bays. A fifth example of the engine optionally includes one or more of the first through fourth examples, and further includes wherein the entrance of the oil drain-back passage is arranged at a top of the crankcase breathing window, relative to a central, vertical axis of the engine. A sixth example of the engine optionally includes one or more of the first through fifth examples, and further includes, wherein the oil drain-back passage is arranged between a coolant jacket surrounding a cylinder of the plurality of cylinders and an exterior wall of the cylinder block. A seventh example of the engine optionally includes one or more of the first through sixth examples, and further includes, wherein the crankcase breathing window is arranged through the at least one bulkhead wall, from a first crankcase bay of the two adjacent crankcase bays to a second crankcase bay of the two adjacent crankcase bays. An eighth example of the engine optionally includes one or more of the first through seventh examples, and further includes wherein a central axis of the crankcase breathing window and a central axis the crankcase are not coaxial with one another, where the central axis of the crankcase is a rotational, central axis of a crankshaft positioned within the crankcase. A ninth example of the engine optionally includes one or more of the first through eighth examples, and further includes, wherein the central axis of the crankcase breathing window is positioned lower than the central axis of the crankcase relative to a central, vertical axis of the engine. A tenth example of the engine optionally includes one or more of the first through ninth examples, and further includes, wherein the central axis of the crankcase breathing window is arranged normal to the at least one bulkhead wall and parallel to a bottom surface of the crankcase. An eleventh example of the engine optionally includes one or more of the first through tenth examples, and further includes an oil pan coupled to the bottom surface of the crankcase. A twelfth example of the engine optionally includes one or more of the first through eleventh examples, and further includes, wherein the piston of each cylinder is coupled to a crankshaft housed within the crankcase. A thirteenth example of the engine optionally includes one or more of the first through twelfth examples, and further includes, wherein the at least one bulkhead wall surrounds a crankshaft and wherein the crankcase breathing window is disposed proximate to an outer wall of the at least one bulkhead, away from the crankshaft.

As another embodiment, an engine includes a cylinder head; and a cylinder block coupled to the cylinder head and including: a crankcase including a central axis and a plurality a bulkhead walls arranged along the central axis, from a front end to a back end of the engine, the plurality of bulkhead walls separated from one another via a plurality of crankcase bays, each bulkhead wall of the plurality of bulkhead walls including an aperture adapted to receive a crankshaft and a crankcase breathing window fluidly coupling two adjacent crankcase bays of the plurality of crankcase bays; and an oil drain-back passage including an inlet end coupled to the cylinder head and an outlet end coupled to the crankcase breathing window. In a first example of the engine, the cylinder block further includes a plurality of cylinders, each cylinder of the plurality of cylinders including a piston disposed therein, and wherein each piston moves within a different crankcase bay of the plurality of crankcase bays. A second example of the engine optionally includes the first example and further includes, wherein the oil drain-back passage is routed through a cylinder block wall of the cylinder block, between a coolant jacket surrounding one cylinder of the plurality of cylinders and an exterior wall of the cylinder block. A third example of the engine optionally includes one or more of the first and second examples, and further includes, wherein the aperture is centered along the central axis of the crankcase and wherein the crankshaft breathing window includes a window central axis offset from the central axis of the crankcase, the window central axis arranged along a length of the crankcase breathing widow, from a first of the two adjacent crankcase bays to a second of the two adjacent crankcase bays.

As yet another embodiment, an engine includes a cylinder head and a cylinder block coupled to the cylinder head and including: a plurality of cylinders arranged in a V where opposing cylinders of the plurality of cylinders in each of two respective cylinder banks are positioned at a non-straight angle relative to one another; a crankcase including a plurality of bulkhead walls and a plurality of crankcase breathing windows, each crankcase breathing window of the plurality of crankcase breathing windows disposed within a different bulkhead wall of the plurality of bulkhead walls, and where adjacent bulkhead walls of the plurality of bulkhead walls are separated from one another via a crankcase bay; and a plurality of oil drain-back passages, each oil drain-back passage of the plurality of oil drain-back passages coupled between the cylinder head and one of the plurality of crankcase breathing windows. In a first example of the engine, the engine further includes an oil pan coupled to a bottom surface of the crankcase, wherein each oil drain-back passage is routed through a wall of the cylinder block, and wherein each crankcase breathing window is offset from a central aperture disposed within a corresponding bulkhead wall, the central aperture adapted to receive a crankshaft.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine, comprising:
a cylinder block including:
a plurality of cylinders, each cylinder including a piston disposed therein and a coolant jacket arranged adjacent to at least a wall of each cylinder;
a crankcase including a plurality of bulkhead walls separating pistons of the plurality of cylinders, where at least two bulkhead walls include at least two crankcase breathing windows disposed symmetrically therein where a first crankcase breathing window is arranged in a first bulkhead wall and a second crankcase breathing window is arranged in a second bulkhead wall opposite the first bulkhead wall from a crankshaft, and where the crankcase breathing windows fluidly couple two adjacent crankcase bays, wherein a top of the at least two crankcase windows is below a central axis of an aperture of the crankcase configured to receive the crankshaft; and
at least two oil drain-back passages including an entrance into the crankcase at the crankcase breathing windows, wherein the at least two oil drain-back passages are arranged radially exterior to the coolant jacket and extend through the first and second bulkhead walls, and where a first oil drain-back passage is shaped to receive suction from the first crankcase breathing window and where a second oil drain-back passage is shaped to receive suction from the second crankcase breathing window.

2. The engine of claim 1, further comprising a cylinder head coupled to the cylinder block and wherein the first oil drain-back passage is routed through a first wall of the cylinder block, from the cylinder head to the first crankcase breathing window in the first bulkhead wall, and where the second oil drain-back passage is routed through a second wall of the cylinder block opposite the first wall, from the cylinder head to the second crankcase breathing window in the second bulkhead wall.

3. The engine of claim 2, wherein the at least two oil drain-back passages are routed through the opposite walls of the cylinder block, radially outside of the coolant jacket surrounding a cylinder of the plurality of cylinders, relative to a central, vertical axis of the engine, and where the at least two oil drain-back passages and the coolant jacket are angled less than 90° relative to the at least two crankcase breathing windows.

4. The engine of claim 2, further comprising the cylinder head coupled to the cylinder block and wherein the first oil drain-back passage is arranged in the first wall of the cylinder block and includes an inlet end coupled to the cylinder head and an outlet end coupled to only the first crankcase breathing window also arranged on the first wall.

5. The engine of claim 1, wherein the entrances of the at least two oil drain-back passages are arranged between the two adjacent crankcase bays.

6. The engine of claim 1, wherein the entrance of the at least two oil drain-back passages are arranged at a top of the at least two crankcase breathing windows, relative to a central, vertical axis of the engine.

7. The engine of claim 1, wherein the at least two oil drain-back passages are arranged between a plurality of coolant jackets including the coolant jacket surrounding a cylinder of the plurality of cylinders and exterior walls of the cylinder block.

8. The engine of claim 1, wherein one of the at least two crankcase breathing windows is arranged through one of the at least two bulkhead walls, from a first crankcase bay of the two adjacent crankcase bays to a second crankcase bay of the two adjacent crankcase bays, and where the first and second crankcase bays are arranged between the first and second bulkhead walls.

9. The engine of claim 1, wherein central axes of the at least two crankcase breathing windows and a central axis of the crankcase are not coaxial with one another, where the central axis of the crankcase is a rotational, central axis of the crankshaft positioned within the crankcase.

10. The engine of claim 9, wherein the central axes of the at least two crankcase breathing windows are positioned lower than the central axis of the crankcase relative to a central, vertical axis of the engine.

11. The engine of claim 9, wherein the central axes of the at least two crankcase breathing windows are arranged normal to the at least two bulkhead walls and parallel to a bottom surface of the crankcase, and where the central axes of the at least two crankcase breathing windows are arranged directly across from one another on opposite sides of the bulkhead wall.

12. The engine of claim 11, further comprising an oil pan coupled to the bottom surface of the crankcase.

13. The engine of claim 1, wherein the piston of each cylinder is coupled to the crankshaft housed within the crankcase.

14. The engine of claim 13, wherein the at least two bulkhead walls surround the crankshaft and wherein the at least two crankcase breathing windows are only disposed proximate to an outer wall of the at least two bulkhead walls, away from the crankshaft.

15. An engine, comprising:
a cylinder head; and
a cylinder block coupled to the cylinder head and including:
a crankcase including a central axis and a plurality of bulkhead walls arranged along the central axis, from a front end to a back end of the engine, the plurality of bulkhead walls separated from one another via a plurality of crankcase bays, each bulkhead wall of the plurality of bulkhead walls including an aperture adapted to receive a crankshaft and a crankcase breathing window fluidly coupling two adjacent crankcase bays of the plurality of crankcase bays, where a first crankcase breathing window is arranged in a first bulkhead wall of the plurality of bulkhead walls and where a second crankcase breathing window is arranged in a second bulkhead wall opposite the first; and
a first oil drain-back passage arranged in the first bulkhead wall including an inlet end coupled to the cylinder head and an outlet end coupled to the first crankcase breathing window shaped to receive a suction force from the first crankcase breathing window and a second oil drain-back passage arranged in the second bulkhead wall including an inlet end coupled to the cylinder head and an outlet end coupled to the second crankcase breathing window.

16. The engine of claim 15, wherein the cylinder block further includes a plurality of cylinders, each cylinder of the plurality of cylinders including a piston disposed therein, and wherein each piston moves within a different crankcase bay of the plurality of crankcase bays.

17. The engine of claim 16, wherein the first oil drain-back passage is routed through a first side of a cylinder block wall of the cylinder block, between a coolant jacket surrounding one cylinder of the plurality of cylinders and an exterior wall of the cylinder block.

18. The engine of claim 15, wherein the aperture is centered along the central axis of the crankcase and wherein the first and second crankshaft breathing windows include parallel window central axes offset from and below the central axis of the crankcase, the window central axes arranged along a length of the first and second crankcase breathing windows, from a first of the two adjacent crankcase bays to a second of the two adjacent crankcase bays.

19. An engine, comprising:
a cylinder head; and
a cylinder block coupled to the cylinder head and including:
a plurality of cylinders arranged in a V where opposing cylinders of the plurality of cylinders in each of two respective cylinder banks are positioned at a non-straight angle relative to one another;
a crankcase including a plurality of bulkhead walls and a plurality of crankcase breathing windows, each crankcase breathing window of the plurality of crankcase breathing windows disposed within a different bulkhead wall of the plurality of bulkhead walls, and where central axes of the crankcase breathing windows are below a central axis of the crankcase, and where adjacent bulkhead walls of the plurality of bulkhead walls are separated from one another via a crankcase bay; and
a plurality of oil drain-back passages, each oil drain-back passage of the plurality of oil drain-back passages coupled between the cylinder head and one of the plurality of crankcase breathing windows, wherein a first crankcase breathing window of the plurality of crankcase breathing windows and a first oil drain-back passage of the plurality of oil drain-back passages are arranged in a first bulkhead wall, and where a second crankcase breathing window of the plurality of crankcase breathing windows and a second oil drain-back passage of the plurality of oil drain-back passages are arranged in a second bulkhead wall opposite the first, and where first and second coolant jackets are arranged between the cylinder head and the first and second oil drain-back passages.

20. The engine of claim 19, wherein the oil pan is coupled to a bottom surface of the crankcase, wherein each oil drain-back passage is routed through a wall of the cylinder block, and wherein each crankcase breathing window is offset from a central aperture disposed within a corresponding bulkhead wall, the central aperture adapted to receive a crankshaft.

* * * * *